(12) United States Patent
Ozawa

(10) Patent No.: US 8,958,108 B2
(45) Date of Patent: Feb. 17, 2015

(54) APPARATUS AND PROGRAM PRODUCT FOR PROCESSING PAGE IMAGES WITH DEFINED PAGE ORDER TO INCREASE EDITING FLEXIBILTY

(71) Applicant: Ryohei Ozawa, Nagoya (JP)

(72) Inventor: Ryohei Ozawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/208,743

(22) Filed: Mar. 13, 2014

(65) Prior Publication Data

US 2014/0293366 A1 Oct. 2, 2014

(30) Foreign Application Priority Data

Mar. 29, 2013 (JP) .................................. 2013-074004

(51) Int. Cl.
*G06K 15/02* (2006.01)
*G06F 3/12* (2006.01)
*G06F 17/24* (2006.01)
*H04N 1/387* (2006.01)
*G06K 9/00* (2006.01)
*H04N 1/21* (2006.01)
*H04N 1/40* (2006.01)

(52) U.S. Cl.
CPC ............ *H04N 1/387* (2013.01); *G06K 9/00483* (2013.01); *H04N 1/2166* (2013.01); *H04N 1/40* (2013.01)
USPC ........ 358/1.15; 358/1.16; 358/1.18; 358/452; 715/251; 715/255

(58) Field of Classification Search
None
See application file for complete search history.

(56) References Cited

U.S. PATENT DOCUMENTS

| | | | |
|---|---|---|---|
| 6,148,164 A * | 11/2000 | Shima | 358/1.12 |
| 7,170,630 B2 * | 1/2007 | Kataoka | 358/1.16 |
| 2004/0194033 A1 * | 9/2004 | Holzwarth et al. | 715/530 |
| 2012/0019863 A1 * | 1/2012 | Sensu et al. | 358/1.15 |
| 2013/0227400 A1 * | 8/2013 | Morita | 715/251 |
| 2014/0104657 A1 * | 4/2014 | Yamaneki | 358/1.9 |

FOREIGN PATENT DOCUMENTS

| | | |
|---|---|---|
| JP | 2006-031181 A | 2/2006 |
| JP | 2007-036406 A | 2/2007 |
| JP | 2009-199357 A | 9/2009 |
| JP | 2009-230632 A | 10/2009 |
| JP | 2011-066511 A | 3/2011 |
| JP | 2011-066672 A | 3/2011 |
| JP | 2012-195777 A | 10/2012 |

* cited by examiner

*Primary Examiner* — Scott A Rogers
(74) *Attorney, Agent, or Firm* — Banner & Witcoff, Ltd.

(57) ABSTRACT

There is provided an image processing apparatus includes a control device configured to store, in a memory of the image processing apparatus, image data representing a plurality of page images to which page orders are defined, respectively, wherein the plurality of page images include a first page image to which a first page order is defined, a second page image to which a second page order is defined, and a third page image to which a third page order is defined, and wherein the second page order is a page order between the first page order and the third page order, acquire read data generated by reading an original, and if the read data includes the first page image and the third page image, delete the second page image from the image data to generate edited image data.

17 Claims, 13 Drawing Sheets

FIRST ILLUSTRATIVE EMBODIMENT

DELETION

TARGET IMAGE DATA (BEFORE EDIT)

READ DATA

START ORDER SN = "2"
END ORDER EN = "6"

TARGET IMAGE DATA (EDITED)

ONE PAGE DELETION

TARGET IMAGE DATA (BEFORE EDIT)

READ DATA

START ORDER SN = "10"

END ORDER EN = NO SETTING

TARGET IMAGE DATA (EDITED)

ADDITION

TARGET IMAGE DATA (BEFORE EDIT) — OGF

READ DATA

START ORDER SN = "4"
END ORDER EN = "5"

TARGET IMAGE DATA (EDITED) — GF3

REPLACEMENT (DELETION + ADDITION)

TARGET IMAGE DATA (BEFORE EDIT)

READ DATA

START ORDER SN = "3"
END ORDER EN = "7"

TARGET IMAGE DATA (EDITED)

WHITE SHEET UTILIZATION (REPLACEMENT)

TARGET IMAGE DATA (BEFORE EDIT)

READ DATA

START ORDER SN = "0"

END ORDER EN = "6"

TARGET IMAGE DATA (EDITED)

TARGET IMAGE DATA (BEFORE EDIT)

ORIGINAL (BOTH SURFACES) OF USER

READ DATA (BOTH SURFACES READ)

READ DATA (AFTER PRE-PROCESSING)

START ORDER SN = "3"
END ORDER EN = "8"

TARGET IMAGE DATA (EDITED)

APPARATUS AND PROGRAM PRODUCT FOR PROCESSING PAGE IMAGES WITH DEFINED PAGE ORDER TO INCREASE EDITING FLEXIBILTY

CROSS-REFERENCE TO RELATED APPLICATION

This application claims priority from Japanese Patent Application No. 2013-074004, filed on Mar. 29, 2013, the entire subject matter of which is incorporated herein by reference.

TECHNICAL FIELD

This disclosure relates to image processing on image data, and in particular, to image processing for editing image data representing a plurality of page images.

BACKGROUND

Electronic image data of images is widely used so as to store the images, and there has been know various techniques for editing those image data. For example, JP-A-2009-199357 discloses a technique which edits an electronic document using a scanned document. Specifically, the scanned document is generated by reading, with a scanner, an original of a plurality of pages including an original of two pages same as or similar to two consecutive pages in an electronic document. An image processing apparatus analyzes the scanned document to specify two consecutive pages in the electronic document. The image processing apparatus executes processing for replacing the two specified pages in the electronic document with similar pages in the scanned document or executes processing for adding a new page in the scanned document between the two specified pages in the electronic document. As a result, the user can edit the electronic document using the original.

However, in this technique, it is assumed to use an original of two pages same as or similar to two consecutive pages in an electronic document. Therefore, image data could not be flexibly edited.

SUMMARY

This disclosure provides a new technique capable of flexibly editing image data using read data obtained by reading an original.

According to an aspect of this disclosure, there is provided an image processing apparatus including a control device configured to: store, in a memory of the image processing apparatus, image data representing a plurality of page images to which page orders are defined, respectively, wherein the plurality of page images include a first page image to which a first page order is defined, a second page image to which a second page order is defined, and a third page image to which a third page order is defined, and wherein the second page order is a page order between the first page order and the third page order; acquire read data generated by reading an original; and if the read data includes the first page image and the third page image, delete the second page image from the image data to generate edited image data.

According to this configuration, the second page image can be deleted from the image data by using the original including the first page image and the second page image. Therefore, it is possible to flexibly edit image data by using an original.

The present invention can be realized in various forms, and for example, can be realized in the form of a method of realizing the functions of the image processing apparatus, a computer program for realizing the functions of the image processing apparatus, a non-transitory computer-readable storage medium having the computer program recorded thereon, and the like.

BRIEF DESCRIPTION OF THE DRAWINGS

The above and other aspects of this disclosure will become more apparent and more readily appreciated from the following description taken in conjunction with the attached drawings, in which.

DETAILED DESCRIPTION

A. First Illustrative Embodiment

A-1: Configuration of Image Processing System 1000

Figure 1:
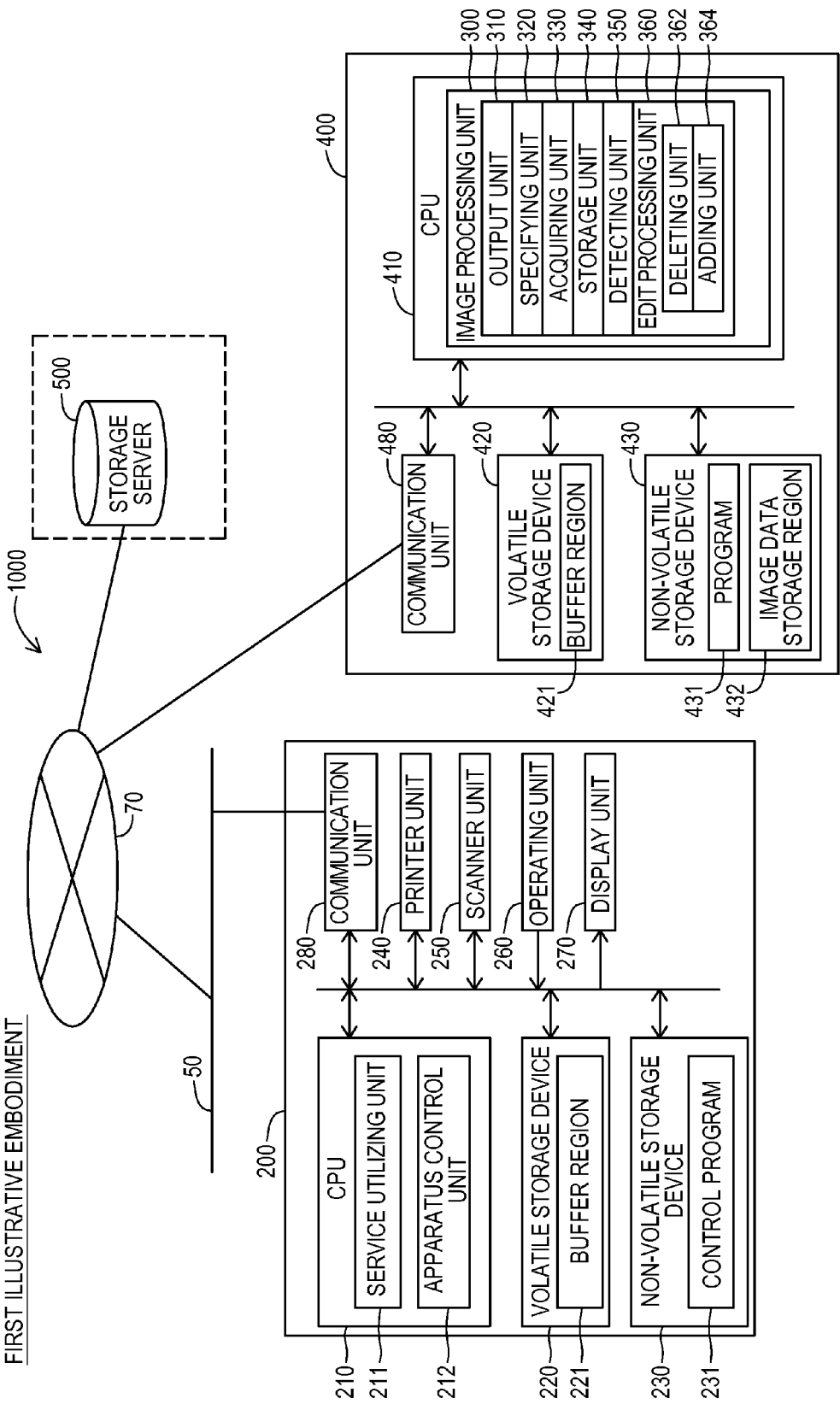
FIG. 1 is a block diagram showing a configuration of an image processing system according to a first illustrative embodiment.

FIG. 1 is a block diagram showing a configuration of an image processing system according to a first illustrative embodiment. An image processing system 1000 includes a server 400 as an image processing apparatus, and a multi-function peripheral 200. The server 400 is connected to the Internet 70, and the multi-function peripheral 200 is connected to the Internet 70 through a Local Area Network (LAN) 50. That is, the server 400 and the multi-function peripheral 200 can perform communication through the LAN 50 and the Internet 70.

The multi-function peripheral 200 includes a CPU 210, a volatile storage device 220, such as a Dynamic Random Access Memory (DRAM), a non-volatile storage device 230, such as a flash memory or a hard disk drive, a printer unit 240, a scanner unit 250, an operating unit 260, such as a touch panel or buttons, a display unit 270, such as a liquid crystal display, and a communication unit 280 which includes an interface for connection to a network, such as the LAN 50.

The volatile storage device 220 includes a buffer region 221 which temporarily stores various kinds of data generated when the CPU 210 performs processing. The non-volatile storage device 230 stores a control program 231.

The printer unit 240 executes printing using a printing system, such as an ink jet printing system or a laser printing system. The scanner unit 250 is a reading execution unit which reads an original using a photoelectric conversion element, such as a Charge Coupled Device (CCD) or a Complementary Metal Oxide Semiconductor (CMOS), to generate scan data. The scan data is bitmap data configured by RGB pixel data, that is, RGB image data.

The CPU 210 executes the control program 231 to function as a service utilizing unit 211 and an apparatus control unit 212. The service utilizing unit 211 accesses the server 400 to execute processing for utilizing a service (described below) provided by the server 400. The apparatus control unit 212 performs control such that, for example, the printer unit 240 or the scanner unit 250 executes copying processing, printing processing, scanning processing, or the like.

The server 400 includes a CPU 410, a volatile storage device 420, such as a DRAM, a non-volatile storage device 430, such as a hard disk drive or a flash memory, and a communication unit 480 which includes an interface for connection to a network, such as the Internet 70. The volatile storage device 420 includes a buffer region 421 which temporarily stores various kinds of intermediate data generated when the CPU 410 performs processing. The non-volatile storage device 430 stores a computer program 431 which causes the CPU 410 to perform image processing (described below). The computer program 431 may be provided in the form recorded in a Digital Versatile Disc Read Only Memory (DVD-ROM) or the like. The non-volatile storage device 430 includes an image data storage region 432 which stores image data (described below).

The CPU 410 executes the computer program 431 to function as an image processing unit 300. The image processing unit 300 executes image processing for editing image data as one of services (described below) provided to the user of the multi-function peripheral 200 by the server 400. The image processing unit 300 includes an output unit 310, a specifying unit 320, an acquiring unit 330, a storage unit 340, a detecting unit 350, and an edit processing unit 360. The edit processing unit 360 includes a deleting unit 362 and an adding unit 364. Specific image processing which is performed by each of these functional units will be described below.

A-1: Operation of Image Processing System 1000

The server 400 provides a storage service for storing image data to the user of the multi-function peripheral 200. For example, the user causes the scanner unit 250 of the multi-function peripheral 200 to read an original, thereby generating image data. For example, as described below, image data of this illustrative embodiment may be a PDF file including a plurality of page images. The service utilizing unit 211 of the multi-function peripheral 200 uploads the generated image data to the server 400 based on a user instruction. The image data uploaded to the server 400 is stored in the image data storage region 432 (FIG. 1) of the server 400.

The user can appropriately utilize image data stored in the image data storage region 432. For example, the service utilizing unit 211 of the multi-function peripheral 200 downloads image data from the server 400 based on a user instruction. For example, the downloaded image data is used to print a plurality of page images using the printer unit 240 of the multi-function peripheral 200.

As a service associated with the storage service provided by the server 400, the image processing unit 300 of the server 400 executes image processing for editing image data to be processed to generate edited image data. The operation of the image processing system 1000 including this image processing will be described.

Figure 2:
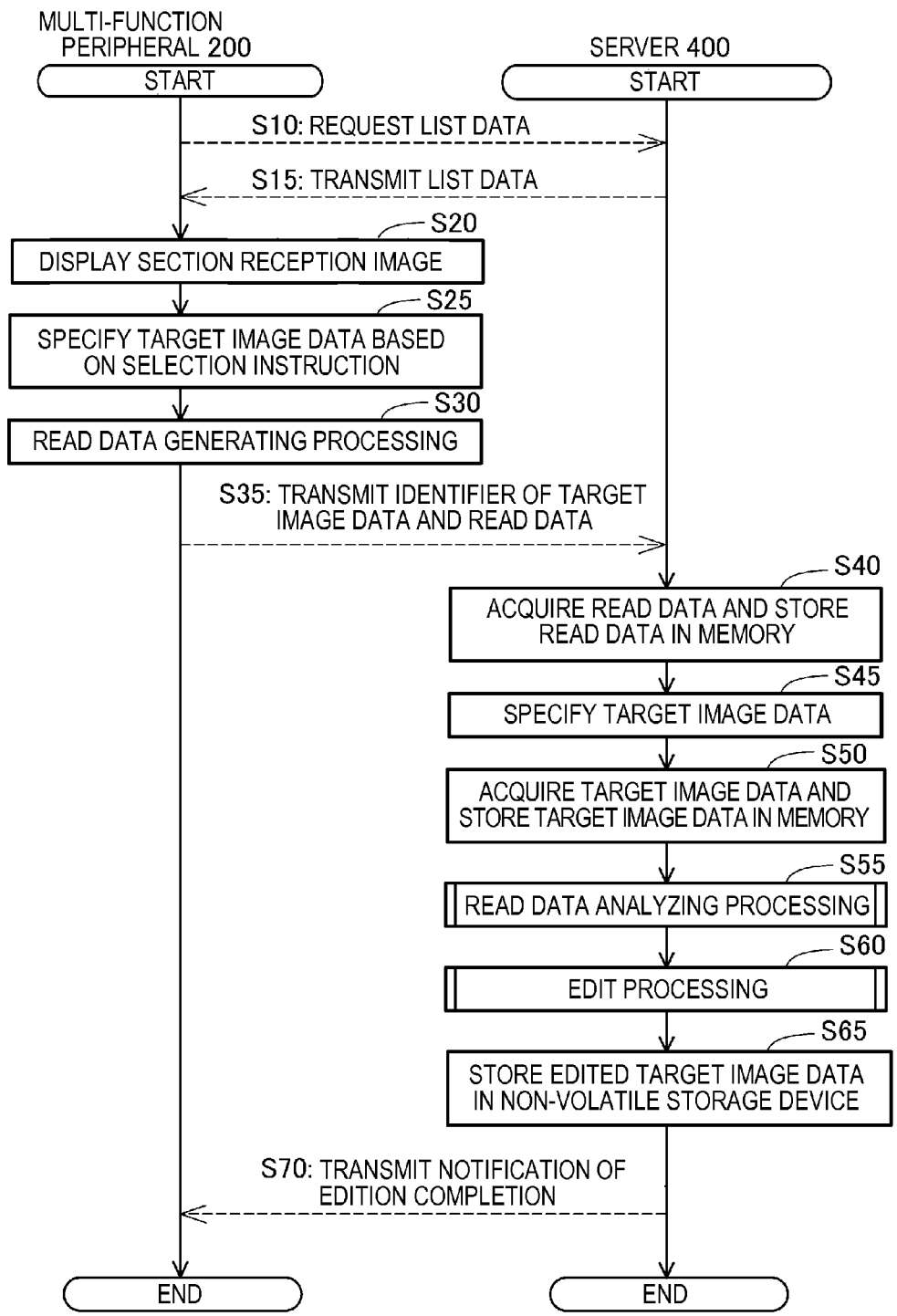
FIG. 2 is a flowchart showing an operation of an image processing system 1000.

FIG. 2 is a flowchart showing an operation of the image processing system 1000. The processing of this flowchart is executed when the multi-function peripheral 200 receives an execution instruction of a specific operation mode such as an edit mode, from the user.

If the processing starts, in Step S10, the service utilizing unit 211 of the multi-function peripheral 200 requests the server 400 for list data representing a list of a plurality of image data uploaded from the multi-function peripheral 200 and stored in the image data storage region 432. In Step S15, the output unit 310 (FIG. 1) of the server 400 transmits the list data as a response to the request to the multi-function peripheral 200. The list data includes identification information, such as a file name or the like for identifying one or more image data. The communication between the multi-function peripheral 200 and the server 400 is executed using a predetermined protocol, which is, in this illustrative embodiment, a Hyper Text Markup Language (HTML) protocol.

If the multi-function peripheral 200 receives the list data, subsequently, in Step S20, the service utilizing unit 211 displays a selection reception image MI1 on the display unit 270 of the multi-function peripheral 200 and receives a selection instruction from the user. Data representing the selection reception image MI1 is generated by the multi-function peripheral 200 using the list data received from the server 400.

Figure 3:
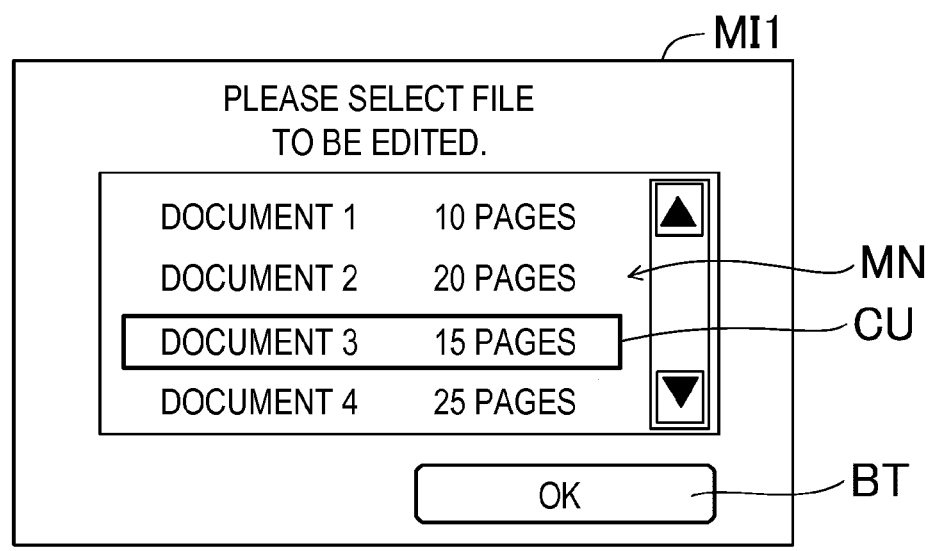
FIG. 3 is a diagram showing an example of a selection reception image MI1.

FIG. 3 is a diagram showing an example of the selection reception image MI1. The selection reception image MI1 of FIG. 3 includes information of selectable image data as an edit target, that is, in the example of FIG. 3, a list MN includes file names and the number of pages. The user moves a cursor CU, selects image data to be edited, and selects an OK button BT1, thereby inputting a selection instruction of image data to be edited (hereinafter, also referred to as "target image data").

In Step S25, the service utilizing unit 211 specifies target image data based on the selection instruction received from the user and acquires identification information, such as a file name for identifying the specified target image data.

Figure 4A:
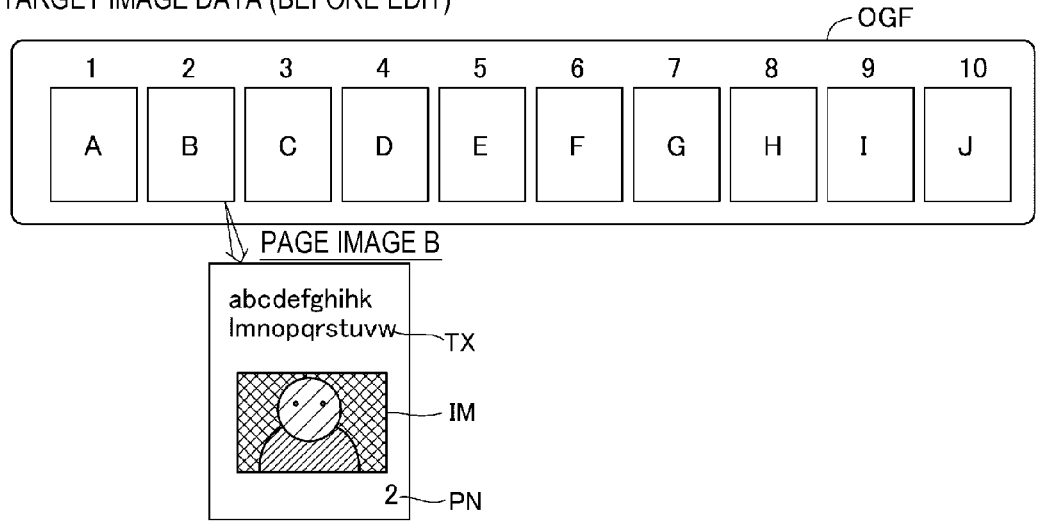
FIGS. 4A to 4C are first diagrams showing examples of target image data and read data in the first illustrative embodiment.
Figure 4B:
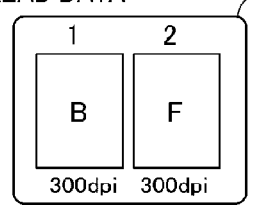
Figure 4C:
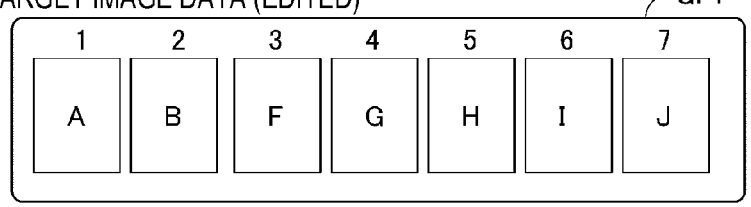

FIGS. 4A to 4C are first diagrams showing examples of target image data and read data in the first illustrative embodiment. Hereinafter, for example, target image data OGF shown in FIG. 4A will be described. The target image data OGF of the first illustrative embodiment is, for example, a file in a PDF format and includes a plurality of page images A to J, to which page orders are defined, respectively. In FIG. 4A, numerals 1 to 10 attached above the plurality of page images A to J represent the page orders. The page orders are defined by an order in which page data representing a page image is stored in the target image data OGF, that is, by the arrangement order of page data in the target image data OGF. Incidentally, for example, the page orders may be defined by associating order definition information, such as number representing page orders, with respective page images in the target image data OGF.

The file in a PDF format will be specifically described. The file in a PDF format is a file having a tree structure which includes header data and a plurality of page data. Each of the plurality of page data is image data representing a corresponding page image, and is, for example, image data in a JPEG format. In the header data, a plurality of link information for identifying the plurality of page data are described in an order corresponding to the page orders. For example, when the display device displays a file in a PDF format, the display device reads the header data and displays page image corresponding to each page data in an order in which the plurality of link information are described.

FIG. 4A shows a page image B as an example of a page image. As in the example of the page image B, this page image includes, for example, contents, such as text TX and a photograph IM, and a page number PN arranged in a footer region of the page image. The page number PN is a number specific to a page image, and does not necessarily coincide with the above-described page order. For example, in the edited target image data described below, a page number PN in a specific page image may not coincide with a page order defined to the specific page image.

If the target image data is specified, subsequently, in Step S30, the service utilizing unit 211 executes read data generating processing for generating read data for instructing an edit content to be executed on the target image data OGF. Specifically, the service utilizing unit 211 displays, on the display unit 270, a message which prompts the user to set an original (hereinafter, also referred to as an edit-instruction original) for generating read data in the scanner unit 250 of the multi-function peripheral 200. The message which prompts the user to set the original in the scanner unit 250 of the multi-function peripheral 200 is not shown.

The user prepares a plurality of sheets of original having the plurality of page images A to J in the target image data OGF formed on one surface thereof. The user may store the plurality of sheets of the original used when generating the target image data OGF and uploading the target image data OGF to the server 400. Alternatively, the user may download the target image data OGF from the server 400 and may print the target image data OGF, thereby obtaining a necessary original. The user prepares an edit-instruction original using an original for two pages or one page from the plurality of sheets of original representing the plurality of page images A to J, and sets the edit-instruction original in the scanner unit 250.

The service utilizing unit 211 reads one surface of the edit-instruction original having the page image arranged thereon by using the scanner unit 250, thereby generating read data. Hereinafter, for example, read data SD1 shown in FIG. 4B will be described. The read data SD1 is, for example, a file in a PDF format and includes two page images B and F. Similarly to the target image data OGF, page orders are defined to the two page images B and F of the read data SD1, respectively. In FIG. 4B, numerals 1 and 2 attached above the two page images B and F represent page orders. Since the read data SD1 is generated in a page order along a reading order, the page order of the read data SD1 represents a reading order when generating the read data SD1. Accordingly, it can be said that the reading order is defined to the two page images B and F of the read data.

Incidentally, in the read data, the number of pixels of first partial read data generated by reading a first original in an initial reading order and the number of pixels of second partial read data generated by reading a second original in a last reading order is assumed to be the number of pixels corresponding to 300 dot per inch (dpi). In the example of FIG. 4B, the number of pixels of the first partial read data of the read data SD1, that is, data representing the page image B and the number of pixels of the second partial read data, that is, data representing the page image F is assumed to be the number of pixels corresponding to 300 dpi. Incidentally, in the read data, the number of pixels of third partial read data generated by reading a different original read between the first original and the second original is assumed to be the number of pixels corresponding to 600 dpi. That is, the number of pixels per page of each of the first partial read data and the second partial read data is smaller than the number of pixels per page of the third partial read data. It is noted that the read data SD1 of FIG. 4B does not include the third partial read data. An example of read data including the third partial read data will be described later.

If the read data SD1 is generated, subsequently, in Step S35, the service utilizing unit 211 transmits the identification information of the target image data OGF specified in Step S25 and the read data generated in Step S35 to the server 400.

In Step S40, the acquiring unit 330 of the server 400 receives the read data transmitted from the multi-function peripheral 200 through the communication unit 480 and stores the read data in the buffer region 221. The communication unit 480 is an example of a first receiving unit which receives read data from an external apparatus. In Step S45, the specifying unit 320 specifies target image data based on the identification information transmitted from the multi-function peripheral 200. Accordingly, it is possible to edit appropriate target image data based on the selection instruction of the user. In Step S50, the storage unit 340 acquires the specified target image data OGF from the image data storage region 432 and stores the target image data OGF in the buffer region 421.

Subsequently, in Step S55, the image processing unit 300 executes read data analyzing processing for analyzing the read data stored in the buffer region 421 and recognizing the edit content on the target image data OGF.

Figure 5:
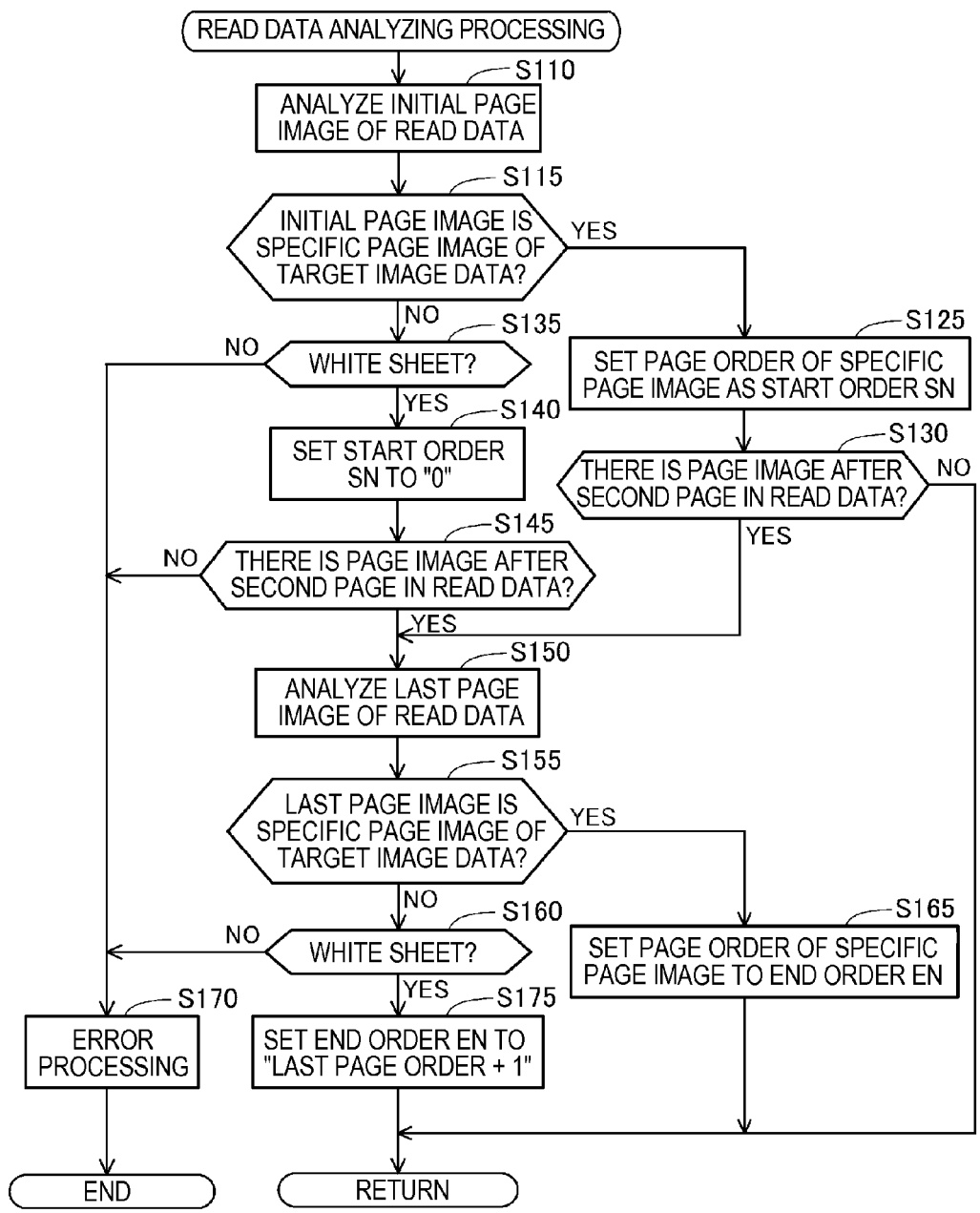
FIG. 5 is a flowchart of read data analyzing processing.

FIG. 5 is a flowchart of read data analyzing processing. In Step S110, the detecting unit 350 analyzes the first partial read data of the read data. Hereinafter, a page image represented by the first partial read data, that is, a page image with the reading order "1" is simply referred to as an initial page image. Specifically, the detecting unit 350 analyzes the footer region or the header region of the initial page image of the read data and detects feature information specific to the initial page image. In the first illustrative embodiment, the detecting unit 350 detects the page number PN (see FIGS. 4A to 4C) which is included in the footer region. The detection of the page number PN is executed using character recognition processing which is used in, for example, a known Optical Character Reader (OCR) technique.

Subsequently, in Step S115, the detecting unit 350 determines whether the initial page image of the read data is a specific page image among the plurality of page images A to J of the target image data OGF. Specifically, the detecting unit 350 determines whether the feature information of the initial page image detected in Step S110, for example, the page number PN coincides with feature information of one of the plurality of page images A to J. The feature information of each the plurality of page images A to J may be detected by analysis in advance and stored in the non-volatile storage device 430 in association with the target image data OGF, or may be acquired by analyzing the target image data OGF in this step. If the feature information of the initial page image of the read data SD1 coincides with the feature information of one of the plurality of page images A to J, it is determined that the initial page image of the read data SD1 is a specific page image having the coincident feature information. If the feature information of the initial page image of the read data SD1 does not coincide with the feature information of any of the plurality of page images A to J, it is determined that the initial page image of the read data SD1 is not a specific page image of the target image data OGF. In the example of FIGS. 4A to 4C, since the initial page image of the read data SD1 is the page image B (FIG. 4B), it is determined that the initial page image of the read data SD1 is the page image B (FIG. 4A) of the target image data OGF.

If the initial page image of the read data is a specific page image of the target image data OGF (Step S115: YES), the image processing unit 300 sets the page order of the specific page image as a start order SN. In the example of FIGS. 4A to 4C, the page order "2" of the page image B of the target image data OGF is set as the start order SN (Step S125). The start order SN is used in edit processing (FIG. 2: Step S60) (described below).

Subsequently, in Step S130, the image processing unit 300 determines whether there is a page image after the first page in the read data. In the example of FIG. 4B, since the read data SD1 includes a second page image, it is determined that there is a page image after the first page in the read data SD1. An example where a second page image is not included in read data, that is, an example of read data having only one page will be described below.

If there is no page image after the first page in the read data (Step S130: NO), the read data analyzing processing ends, and the process proceeds to edit processing of FIG. 2. If there is a page image after the first page in the read data (Step S130: YES), the image processing unit 300 proceeds to Step S150.

In Step S115, if the initial page image of the read data is not a specific page image of the target image data OGF (Step S115: NO), the detecting unit 350 determines whether the initial page image of the read data is a white sheet (Step S135). For example, if the number of pixels having a color value different from an average color value of all pixels constituting the initial page image by a reference value TH1 or larger is equal to or smaller than a reference value TH2, the detecting unit 350 determines that the initial page image is a white sheet.

If the initial page image of the read data is not a white sheet (Step S135: NO), the image processing unit 300 executes error processing (Step S170) and stops the image processing. This is because, in this image processing, it is not assumed a case where the initial page image of the read data is not a specific page image of the target image data OGF and is not a white sheet. The error processing is processing of providing, to the multi-function peripheral 200, a notification to the effect that read data is not appropriate and thus the processing has stopped.

If the initial page image of the read data is a white sheet (Step S135: YES), the image processing unit 300 sets the start order SN to an order one before the initial page order "1" of the target image data OGF, that is, "0" (Step S140).

Subsequently, in Step S145, similarly to Step S135 described above, the image processing unit 300 determines whether there is a page image after the first page in the read data. If there is no page image after the first page in the read data (Step S145: NO), the image processing unit 300 executes the above-described error processing (Step S170) and stops the image processing. This is because, in this image processing, it is not assumed a case where the read data includes only a page image of a white sheet.

If there is a page image after the first page in the read data (Step S135: YES or Step S145: YES), the detecting unit 350 analyzes the second partial read data of the read data (Step S150). Hereinafter, a page image represented by the second partial read data, that is, a page image in a last reading order is simply referred to as a last page image. Specifically, similarly to the analysis of the initial page image, the detecting unit 350 analyzes the footer region or the header region of the last page image of the read data and detects feature information specific to the last page image.

Subsequently, in Step S155, the detecting unit 350 determines whether the last page image of the read data is a specific page image among the plurality of page images A to J of the target image data OGF. Specifically, similarly to the processing on the initial page image in Step S115, the determination is made based on whether the feature information of the last page image detected in Step S150 coincides with the feature information of one of the plurality of page images A to J. In the example of FIGS. 4A to 4C, since the last page image of the read data SD1 is the page image F (FIG. 4B), it is determined that the last page image of the read data SD1 is the page image F (FIG. 4A) of the target image data OGF.

If the last page image of the read data is a specific page image of the target image data OGF (Step S155: YES), the image processing unit 300 sets the page order of the specific page image as the end order EN. In the example of FIGS. 4A to 4C, the page order "6" of the page image F of the target image data OGF is set as the end order EN (Step S165). The end order EN is used in the edit processing (FIG. 2: Step S60) (described below) together with the start order SN.

If the last page image of the read data is not a specific page image of the target image data OGF (Step S155: NO), the detecting unit 350 determines whether the last page image of the read data is a white sheet (Step S160). For example, the determination on whether the last page image of the read data is a white sheet is executed in a similar manner to the processing in Step S135 described above.

If the last page image of the read data is not a white sheet (Step S160: NO), the image processing unit 300 executes the error processing (Step S170) and stops the image processing. This is because, in this image processing, it is not assumed a case where the last page image of the read data is not a specific page image of the target image data OGF and is not a white sheet.

If the last page image of the read data is a white sheet (Step S160: YES), the image processing unit 300 sets the end order EN to an order one after the last page order of the target image data OGF (Step S175). For example, if the last page order of the target image data OGF is "10", the end order EN is set to "11".

In Step S165 or S175, if the end order EN is set, the read data analyzing processing ends.

If the read data analyzing processing ends, except for a case where the read data analyzing processing is interrupted after the error processing, subsequently, in Step S60 (FIG. 2), the edit processing unit 360 executes edit processing for editing the target image data OGF using the start order SN and the end order EN set in the read data analyzing processing.

Figure 6:
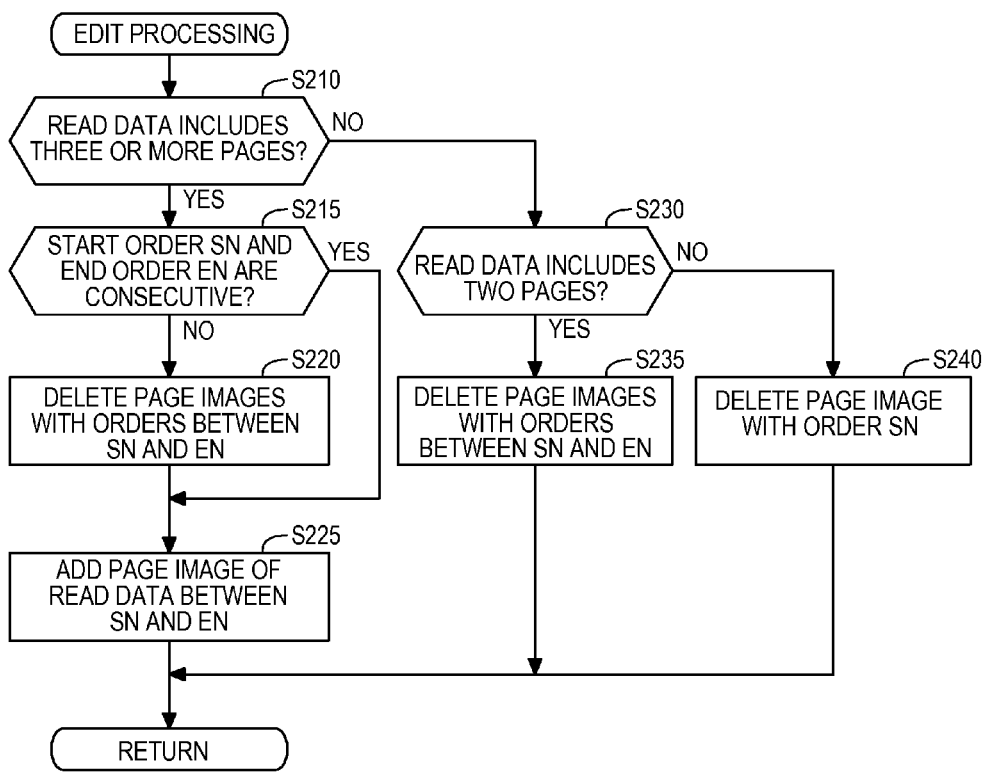
FIG. 6 is a flowchart of edit processing.

FIG. 6 is a flowchart of edit processing. In Step S210, the edit processing unit 360 determines whether read data includes three or more page images.

If the read data does not include three or more page images (Step S210: NO), the edit processing unit 360 determines whether the number of page images included in the read data is two or one (Step S230).

If the number of page images included in the read data is two (Step S230: YES), the deleting unit 362 executes deleting processing for deleting one or more page images to be deleted from the target image data OGF (Step S235). The page images to be deleted are page images to which page orders between a page order represented by the start order SN and a page order represented by the end order EN are defined in the target image data OGF. FIGS. 4A to 4C show an example where deleting processing is performed. In the example of FIGS. 4A to 4C, as described above, the start order SN="2" and the end order EN="6". Accordingly, three page images C, D, and E to which three page orders "3", "4", and "5" between the page order "2" and the page order "6" are defined, are deleted from the target image data OGF, and edited target image data GF1 (FIG. 4C) is thus generated.

Specifically, if the target image data OGF is a file in a PDF format, the deleting unit 362 deletes three page data corresponding to the three page images C, D, and E, and deletes three link information in the header data for identifying three page data to be deleted. The link information is deleted, whereby the order of link information described in an order after the deleted link information is moved up, and as a result, the page order of a page image corresponding to the link information having the order moved up is moved up. For example, in the example of FIGS. 4A to 4C, in the edited target image data GF1 (FIG. 4C), the three page images C, D, and E are deleted from the target image data OGF, and the page orders of five page images F, G, H, I, and J are respectively moved up by three.

Figure 7A:
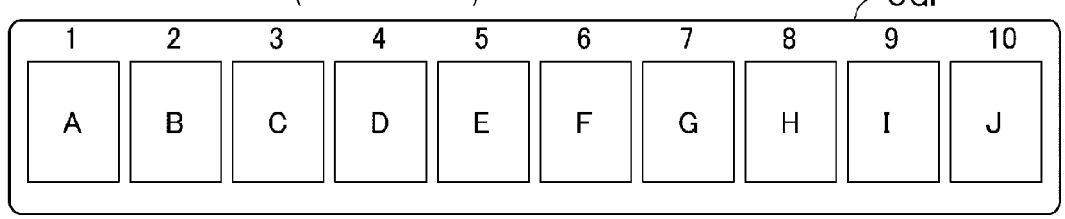
FIGS. 7A to 7C are second diagrams showing examples of target image data and read data in the first illustrative embodiment.
Figure 7B:
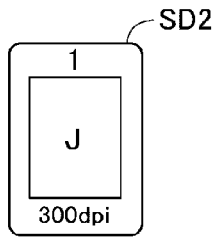
Figure 7C:
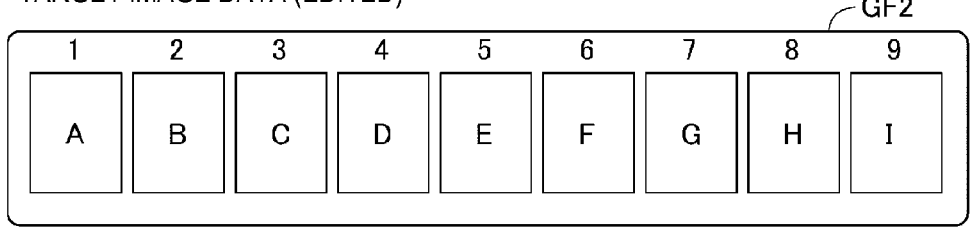

If the number of page images included in the read data is one (Step S230: NO), the deleting unit 362 executes deleting processing for deleting one page to be deleted from the target image data OGF (Step S240). The page image to be deleted is a page image to which a page order represented by the start order SN is defined. FIGS. 7A to 7C are second diagrams showing examples of target image data and read data in the first illustrative embodiment. Since one page image of read data SD2 of FIG. 7B is a page image J, the start order SN="10". Since the read data SD2 includes only one page image, the end order EN is not set. Accordingly, in the example of FIGS. 7A to 7C, the page image J to which the page order "10" is defined, is deleted from the target image data OGF (FIG. 7A), and edited target image data GF2 (FIG. 7C) is thus generated.

Specifically, if the target image data OGF is a file in a PDF format, one page data corresponding to one page image J is deleted, and one link information in header data for identifying the one page data to be deleted is deleted. As a result, in the example of FIGS. 7A to 7C, in the edited target image data GF2 (FIG. 7C), the one page image J is deleted from the target image data OGF.

As in the example of FIGS. 7A to 7C, if one page image of the target image data OGF is included in the read data and other page images are not included in the read data, the one page image is deleted from the target image data OGF. As a result, the user can easily delete one page image from target image data using an original including one page image to be deleted. That is, if the user wants to delete one page image from the target image data OGF, since it is sufficient that the user prepares an original including one page image to be deleted, it is possible to reduce a burden imposed on the user.

Figure 8A:
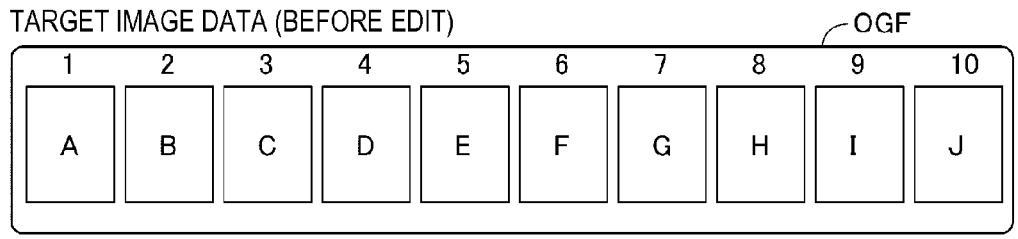
FIGS. 8A to 8C are third diagrams showing examples of target image data and read data in the first illustrative embodiment.
Figure 8B:
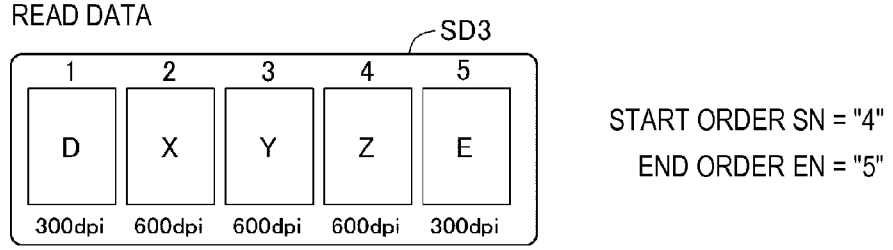
Figure 8C:
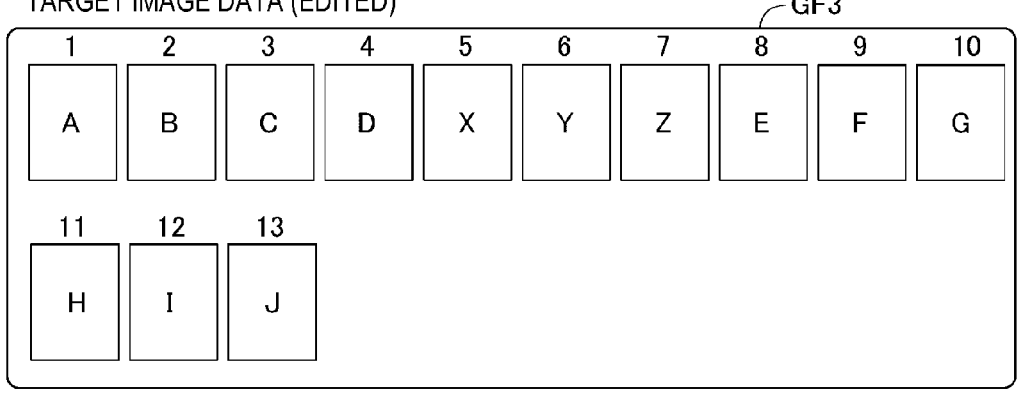

If three or more page images are included in the read data (Step S210: YES), adding processing for adding a page image to the target image data OGF or replacement processing for replacing some page images of the target image data OGF is executed (Steps S215 to S225). FIGS. 8A to 8C are third diagrams showing examples of target image data and read data in the first illustrative embodiment.

Figure 9A:
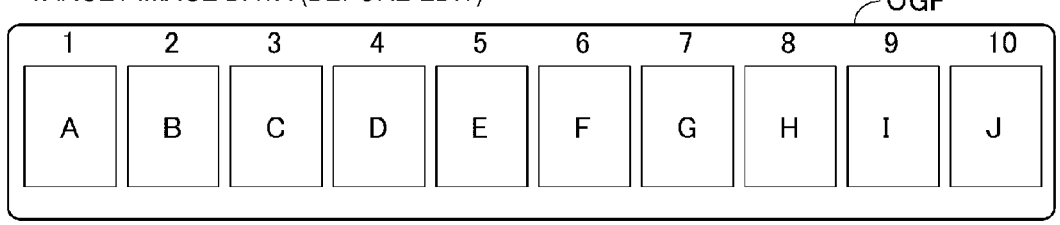
FIGS. 9A to 9C are fourth diagrams showing examples of target image data and read data in the first illustrative embodiment.
Figure 9B:
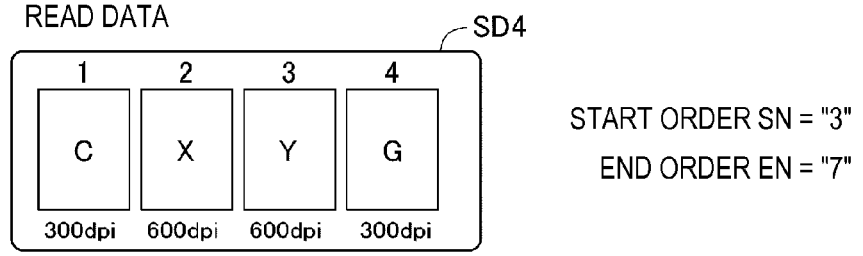
Figure 9C:
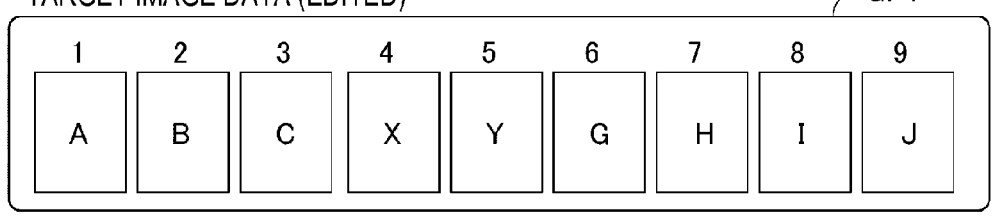

FIGS. 9A to 9C are fourth diagrams showing examples of target image data and read data in the first illustrative embodiment. FIGS. 8A to 8C show an example where adding processing is performed, and read data SD3 of FIG. 8B includes five page images D, X to Z, and E. FIGS. 9A to 9C show an example where replacement processing is performed, and read data SD4 of FIG. 9B includes four page images C, X, Y, and G.

Specifically, in Step S215, the edit processing unit 360 determines whether the start order SN and the end order EN set in the read data analyzing processing are consecutive (Step S215). In the example of FIGS. 8A to 8C, since the initial page image of the read data SD3 is the page image D (FIG. 8B), and the page order of the page image D of the target image data OGF is "4" (FIG. 8A), the start order SN="4". Furthermore, since the last page image of the read data SD3 is the page image E (FIG. 8B), and the page order of the page image E of the target image data OGF is "5" (FIG. 8A), the end order EN="5". In the example of FIGS. 8A to 8C, since a page order subsequent to the start order SN is the end order EN, it is determined that the start order SN and the end order EN are consecutive.

As in the example of FIGS. 8A to 8C, if the start order SN and the end order EN are consecutive (Step S215: YES), Step S220 is skipped and Step S225 is executed. In Step S225, the adding unit 364 of the edit processing unit 360 adds a page image included in the read data to the target image data OGF. The position in the target image data OGF where a new page image is added is between a page image to which a page order represented by the start order SN is defined and a page image to which a page order represented by the end order EN is defined. A page image to be added is a page image which is represented by third partial read data of the read data. As described above, the third partial read data is data which is generated by reading a different original to be read between a first original in an initial reading order and a second original in a last reading order. In the read data SD3 of FIG. 8B, data representing three page images X, Y, and Z is third partial read data. A page image represented by the third partial read data is basically a page image which is not included in the target image data OGF. Hereinafter, the page image represented by the third partial read data is also referred to as a page image to be added.

As a result of executing the adding processing in Step S225, in the example of FIGS. 8A to 8C, the page images X, Y, and Z which are page images to be added are added between the page image D to which the page order "4" is defined and the page image E to which the page order "5" is defined before edit processing, and edited target image data GF3 (FIG. 8C) is thus generated.

Specifically, if the target image data OGF is a file in a PDF format, the adding unit 364 adds three link information for identifying the three page images X, Y, and Z to be added in order between link information for identifying the page image D and link information for identifying the page image E. Then, the adding unit 364 stores three page data representing the three page images X, Y, and Z in the target image data OGF corresponding to the three link information. Page data representing a page image to be added is stored, and corresponding link information is added, whereby the order of link information described in an order after the added link information is moved down. As a result, the page order of a page image corresponding to the link information having the order moved down is moved down. For example, in the example of FIGS. 8A to 8C, in the edited target image data GF3 (FIG. 8C), the three page images X, Y, and Z are added to the target image data OGF, whereby the page orders of the six page images E, F, G, H, I, and J are respectively moved down by three. In the edited target image data GF3 (FIG. 8C), consecutive page orders "5", "6", and "7" from the page order "4" of the page image D of the target image data OGF are defined in the three page images X, Y, and Z to be added.

In the example of FIGS. 9A to 9C, since the initial page image of the read data SD4 is the page image C (FIG. 9B), and the page order of the page image C of the target image data OGF is "3" (FIG. 9A), the start order SN="3". Furthermore, since the last page image of the read data SD4 is the page image G (FIG. 9B), and the page order of the page image G of the target image data OGF is "7" (FIG. 9A), the end order EN="7". In the example of FIGS. 9A to 9C, since the page order "4" subsequent to the start order SN is not the end order EN, it is determined that the start order SN and the end order EN are not consecutive.

As in the example of FIGS. 9A to 9C, if the start order SN and the end order EN are not consecutive (Step S215: NO), the deleting unit 362 of the edit processing unit 360 executes the same deleting processing as in Step S235 described above to delete one or more page images to be deleted from the target image data OGF. In the example of FIGS. 9A to 9C, the three page images D, E, and F to which the three page orders "4", "5", and "6" between the page order "3" and the page order "7" are defined, are deleted from the target image data OGF.

Subsequently to the deleting processing in Step S220, the above-described adding processing in Step S225 is executed. In the read data SD4 of FIG. 9B, data representing two page images X and Y is third partial read data. Accordingly, in the example of FIGS. 9A to 9C, the page images X and Y which are page images to be added are added between the page image C to which the page order "3" is defined and the page image G to which the page order "7" is defined before edit processing. As a result, with the adding processing in Steps S220 and S225, edited target image data GF4 (FIG. 9C) in which the three page images D, E, and F are replaced with the two page images X and Y is generated.

Specifically, in Step S220, if the target image data OGF is a file in a PDF format, the deleting unit 362 deletes three page data corresponding to the three page images D, E, and F, and deletes three link information in header data for identifying the three page data to be deleted. As a result, in the example of FIGS. 9A to 9C, the three page images D, E, and F are deleted from the target image data OGF, whereby the page orders of the four page images G, H, I, and J are respectively moved up by three. Subsequently, in Step S230, the adding unit 364 adds two link information for identifying the two page images X and Y to be added in order between link information for identifying the page image C and link information for identifying the page image G. The adding unit 364 stores the two page data representing the two page images X and Y in the target image data OGF corresponding to the two added link information. As a result, the two page images X and Y are added, whereby the page orders of the four page images G, H, I, and J are respectively moved down by two. Accordingly, since the page orders of the four page images G, H, I, and J are moved up by three in Step S220 and moved down by two in Step S230 compared to the target image data OGF before edit, in the edited target image data GF4 (FIG. 9C), the page orders of the four page images G, H, I, and J are respectively moved up by one in the end. In the edited target image data GF4 (FIG. 9C), consecutive page orders "4" and "5" from the page order "3" of the page image C of the target image data OGF are defined to the two page images X and Y to be added.

As will be understood from the above description, if read data includes three or more page images (Step S210: YES), and the start order SN and the end order EN are consecutive (Step S215: YES), the deleting processing (Step S220) is not performed, and only the adding processing (Step S225) is performed. If read data includes three or more page images (Step S210: YES), and if the start order SN and the end order EN are not consecutive (Step S215: NO), both the deleting processing (Step S220) and the adding processing (Step S225) are performed, whereby the replacement processing is achieved.

If one of Steps S235, S240, and S225 is executed and the edited target image data is generated, the edit processing ends.

Figure 10A:
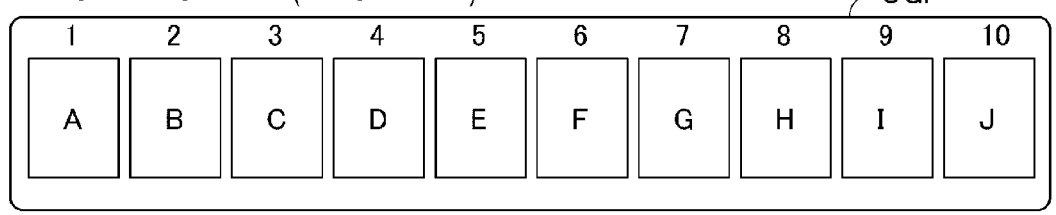
FIGS. 10A to 10C are fifth diagrams showing examples of target image data and read data in the first illustrative embodiment.
Figure 10B:
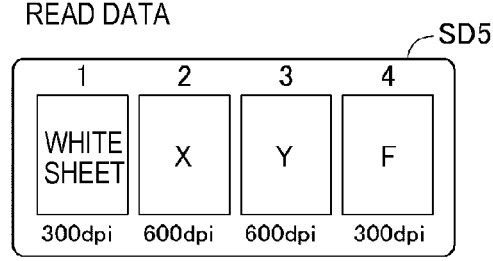
Figure 10C:
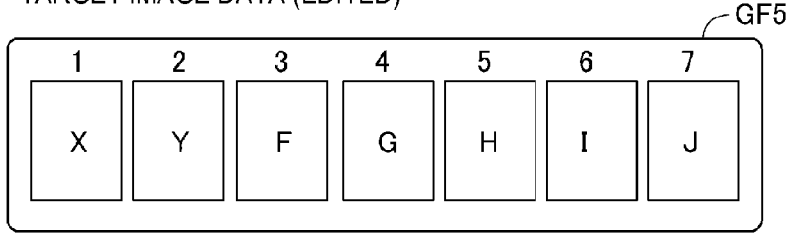

Here, an example where an image of a white sheet is included in read data will be described. FIGS. 10A to 10C are fifth diagrams showing examples of target image data and read data in the first illustrative embodiment. FIGS. 10A to 10C show an example of replacement processing which is performed using read data SD5 (FIG. 10B) including an image of a white sheet. In the example of read data SD5, an image of a white sheet is used for an initial page image, and a page image F is used for a last page image. Accordingly, it is possible to delete one or more page images including the initial page image, specifically, a page image (FIG. 10A) with a page order "1" included in the target image data OGF. For example, in the example of FIGS. 10A to 10C, five page images A to E with the page orders "1" to "5" in the target image data OGF before edit are deleted in Step S220 described above. In other words, in the target image data OGF, the five page images A to E to which the initial page order "1", the page order "5" one before the page order "6" defined to the page image F, and the page orders "2" to "4" between the page order "1" and the page order "5" are defined, are deleted. As a result, in the example of FIG. 10B, it is possible to realize edit processing for generating edited target image data GF5 (FIG. 10C) in which the five page images A to E are replaced with two page images X and Y.

Specifically, in Step S220, if the target image data OGF is a file in a PDF format, the deleting unit 362 deletes five page data corresponding to the five page images A, B, C, D, and E, and deletes five link information in header data for identifying the five page data to be deleted. As a result, in the example of FIGS. 10A to 10C, the five page images A, B, C, D, and E are deleted from the target image data OGF, whereby the page orders of the five page images F, G, H, I, and J are respectively moved up by five. At this time, link information at a first description order becomes link information for identifying the page image F. Subsequently, in Step S230, the adding unit 364 adds two link information for identifying the two page images X and Y to be added in order before the link information for identifying the page image F. The adding unit 364 stores two page data representing the two page images X and Y in the target image data OGF corresponding to the two added link information. As a result, the two page images X and Y are added, whereby the page orders of the five page images F, G, H, I, and J are respectively moved down by two. Accordingly, since the page orders of the five page images F, G, H, I, and J are moved up by five in Step S220 and moved down by two in Step S230 compared to the target image data OGF before edit, in the edited target image data GF5 (FIG. 10C), the page orders of the five page images F, G, H, I, and J are moved up by three in the end. In the edited target image data GF5 (FIG. 10C), consecutive page orders "1" and "2" including "1" as the initial page order of the target image data OGF are respectively defined to the two page images X and Y to be added.

As will be understood from the above description, in the example shown in FIGS. 10A to 10C, an image of a white sheet is an example of a specific page image determined in advance, and the page image F is an example of a third page image.

Although not shown, if read data, in which the last page image of the read data SD5 of FIGS. 10A to 10C is the page image A instead of the page image F is used, it is possible to realize edit processing for adding the two page images X and Y before the initial page image A of the target image data OGF.

If a white sheet is used for the last page image of the read data, it is possible to delete one or more page image including the last page image, for example, page image (FIG. 10A) with the page order "10" included in the target image data OGF. For example, a case where read data obtained by replacing the last page image and the initial page image of the read data SD5 of FIGS. 10A to 10C, that is, read data in which the last page image of the read data SD5 is a white sheet and the initial page is the page image F is used, is considered. In this case, four page images G to J with the page orders "7" to "10" in the target image data OGF before edit are deleted in Step S220 described above. In other words, in the target image data OGF, the four page images G to J to which the last page order "10", the page order "7" one after the page order "6" defined to the page image F, and the page orders "8" and "9" between the page order "7" and the page order "10" are defined, are deleted. In this case, it is possible to realize edit processing for replacing the four page images G to J with the page orders "7" to "10" in the target image data OGF before edit with the two page images X and Y.

Although not shown, if read data, in which the last page image of the read data SD5 of FIGS. 10A to 10C is a white sheet and the initial page image is the page image J, is used, it is possible to realize edit processing for adding the two page images X and Y after the last page image J of the target image data OGF.

As will be understood from the above description, if an image of a white sheet is used, it is possible to delete a plurality of page images including either the page image A to which the initial page order is defined and the page image J to which the last page order is defined, from the target image data OGF.

If the edit processing ends, subsequently, in Step S65 (FIG. 2), the image processing unit 300 stores the edited target image data in the image data storage region 432 of the non-volatile storage device 430. In Step S70, the image processing unit 300 transmits a notification of edit completion to the multi-function peripheral 200. If the notification of edit completion is received, for example, the service utilizing unit 211 of the multi-function peripheral 200 displays, on the display unit 270, a message to the effect that the edit of the target image data OGF is completed.

According to the above-described image processing of the first illustrative embodiment, for example, as in the example of FIGS. 4A to 4C, if the page image B and the page image F of the image data OGF are included in the read data, the page images C, D, and E to which the page orders between the page order defined to the page image B and the page order defined to the page image F are defined, are deleted from the target image data OGF. In this way, the user can delete an arbitrary page image from the target image data OGF using two originals with non-consecutive page orders among a plurality of originals representing page images in the target image data as an edit-instruction original. Accordingly, it is possible to more flexibly edit image data using an original. For example, in a related-art case where two originals included in an edit-instruction original are assumed to be two consecutive originals in the target image data, it is difficult to delete an arbitrary page image from the target image data as in the image processing of the first illustrative embodiment.

Since the size of the display unit 270 of the multi-function peripheral 200 is comparatively small, it is inconvenient to display an edit screen of a general page edit program on the display unit 270 and to edit the target image data. In this Illustrative embodiment, in a situation where there is no personal computer or the like, it is possible to easily edit the target image data using the multi-function peripheral 200 and the original. It can be considered that a plurality of sheets of original including all page images to be represented by target image data after edit are read by the scanner unit 250 to generate the target image data. However, if edit is executed on a comparatively small number of page images in target image data including a comparatively large number of page images, or the like, this method is inefficient. In contrast, in this illustrative embodiment, only by reading a comparatively small number of sheets of original, it is possible to easily edit the target image data.

As will be understood from the example of FIGS. 4A to 4C, according to the image processing of the first illustrative embodiment, two originals are appropriately selected as an edit-instruction original among a plurality of originals representing page images in target image data, whereby the user can easily delete an arbitrary number of page images, that is, K (where K is an integer equal to or greater than two) page images with consecutive page orders from the target image data OGF.

In the example of FIGS. 4A to 4C, the page image B is an example of a first page image, the page image F is an example of a third page image, and each of the three page images C, D, and E is an example of a second page image.

Further, according to the image processing of the first illustrative embodiment, as in the example of FIGS. 9A to 9C, if the page image C and the page image G of the target image data OGF are included in the read data, and the two page images X and Y are included in the read data, the deleting unit 362 deletes the three page images D to F to which the page orders between the page image C and the page image G of the target image data OGF are defined. The adding unit 364 adds the two page images X and Y between the page image C and the page image G of the target image data OGF. Accordingly, in the example of FIGS. 9A to 9C, the edited target image data GF4 in which the three page images D to F are replaced with the two page images X and Y is generated. In this way, the user can replace an arbitrary page image in target image data before edit with an original to be added using an edit-instruction original including two originals with non-consecutive page orders among a plurality of originals representing page images in target image data and the original to be added.

As will be understood from FIG. 9A, in the target image data OGF before edit, the three page orders which are defined to the three page images D to F are "4", "5", and "6". As will be understood from FIG. 9C, in the edited target image data GF4, the two page orders which are defined to the two page images X and Y to be newly added become "4" and "5". That is, in the case of the replacement processing, the most preceding page order among one or more consecutive page orders defined in one or more page images added in the target image data after edit is same as the most preceding page order among one or more consecutive page orders defined in one or more page images to be deleted from at least the target image data OGF before edit.

As will be understood from FIG. 9A, since the number of originals to be added can be arbitrarily set by the user, the user can easily add an arbitrary number of page images, that is, L (where L is an integer equal to or greater than two) page images with consecutive page orders to the target image data OGF.

Similarly to the example of FIGS. 4A to 4C, in the example of FIGS. 9A to 9C, the user can delete an arbitrary number of page images, that is, N (where N is an integer equal to or greater than one) page images from the target image data OGF by appropriately selecting two originals to be used as an edit-instruction original among a plurality of originals representing page images in target image data. That is, according to the image processing of the first illustrative embodiment, if M (where M is an integer equal to or greater than one and different from N) page images to be added are included in read data, the N page images in the target image data OGF before edit can be replaced with the M page images to be added. That is, the user can delete an arbitrary number of page images from target image data and can add an arbitrary number of page images to target image data. Since there is no special condition for replacement, the user can edit target image data more flexibly. For such special condition for replacement, for example, there may be a condition where page images to be added and page images to be deleted are similar to each other.

In the example of FIGS. 9A to 9C, the page image C is an example of a first page image, the page image G is an example of a third page image, and each of the three page images D, E, and F is an example of a second page image. Each of the two page images X and Y is an example of a fourth page image.

According to the image processing of the first illustrative embodiment, in the example of FIGS. 8A to 8C, if the two page images D and E with consecutive page orders of the target image data OGF are included in the read data, and the three page images X, Y, and Z are included in the read data, no page images are deleted from the target image data OGF, and the three page images X, Y, and Z are added between the page image D and the page image E of the target image data OGF. Accordingly, in the example of FIGS. 9A to 9C, the edited target image data GF3 added with the three page images X, Y, and Z is generated. In this way, the user can add arbitrary page images between two page images with consecutive page orders in the target image data before edit using two originals with consecutive page orders among a plurality of originals representing page images in the target image data.

As will be understood from FIG. 8A, in the edited target image data GF3, the three page orders defined to the three added page images X, Y, and Z become "5", "6", and "7". In the target image data OGF before edit, the page orders of the six page images E to J to which the page orders "5" to "10" are defined are moved down to "8" to "13" in the edited target image data GF3. That is, in the case of the adding processing of FIGS. 8A to 8C, the most preceding page order among one or more consecutive page orders which are defined to the one or more page images added in the target image data after edit becomes equal to a page order defined to a page image subsequent to the one or more added page images in the target image data before edit. A page order which is defined to a page image subsequent to the one or more added page images in the target image data after edit becomes a page order subsequent to the last page order among the one or more added page images.

As will be understood from FIGS. 8A to 8C, since the number of originals to be added can be arbitrarily set by the user, the user can easily add an arbitrary number of page images, that is, K (where K is an integer equal to or greater than two) page images with consecutive page orders to the target image data OGF.

In the example of FIGS. 8A to 8C, the page image D is an example of a first page image, the page image E is an example of a fifth page image, and each of the three page images X, Y, and Z is an example of a sixth page image.

According to the image processing of the first illustrative embodiment, the detecting unit 350 detects whether specific image data in the target image data is included in the first partial read data and the second partial read data out of the read data, and does not perform detection processing on the third partial read data. As described above, the first partial read data is data which is generated by reading the first original with the initial reading order. The second partial read data is data which is generated by reading the second original with the last reading order. The third partial read data is data which is generated by reading a different original to be read between the first original and the second original. As a result, the user causes the scanner unit 250 to read a plurality of originals as an edit-instruction original in a predetermined reading order, thereby easily designating a page image to be deleted. As described above, the predetermined reading order is a reading order in which an original including one page image (for example, the page image B of FIG. 4B) of two page images for designating a page image to be deleted is initially read, and an original including the other page image (for example, the page image F of FIG. 4B) is read at last. Since it is sufficient that the detecting unit 350 analyzes the first partial read data and the second partial read data out of the read data, it is possible to reduce an analysis load.

As described above, the number of pixels per page of the first partial read data and the second partial read data, for example, the number of pixels corresponding to 300 dpi is smaller than the number of pixels per page of the third partial read data, for example, the number of pixels corresponding to 600 dpi. As a result, it is possible to reduce the amount of the read data. The first partial read data and the second partial read data are used only for detecting whether a specific page image of the target image data OGF is included, and are not added to the edited target image data. Therefore, high image quality is not required compared to the third partial read data added to the edited target image data. Accordingly, it is considered not a problem that the number of pixels of the first partial read data and the second partial read data is comparatively small.

B. Second Illustrative Embodiment

B-1: Configuration of Multi-Function Peripheral 200A

Although the image processing apparatus of the first illustrative embodiment is the server 400 (FIG. 1) which can perform communication with the multi-function peripheral 200, an image processing apparatus of the second illustrative embodiment is a multi-function peripheral 200A.

Figure 11:
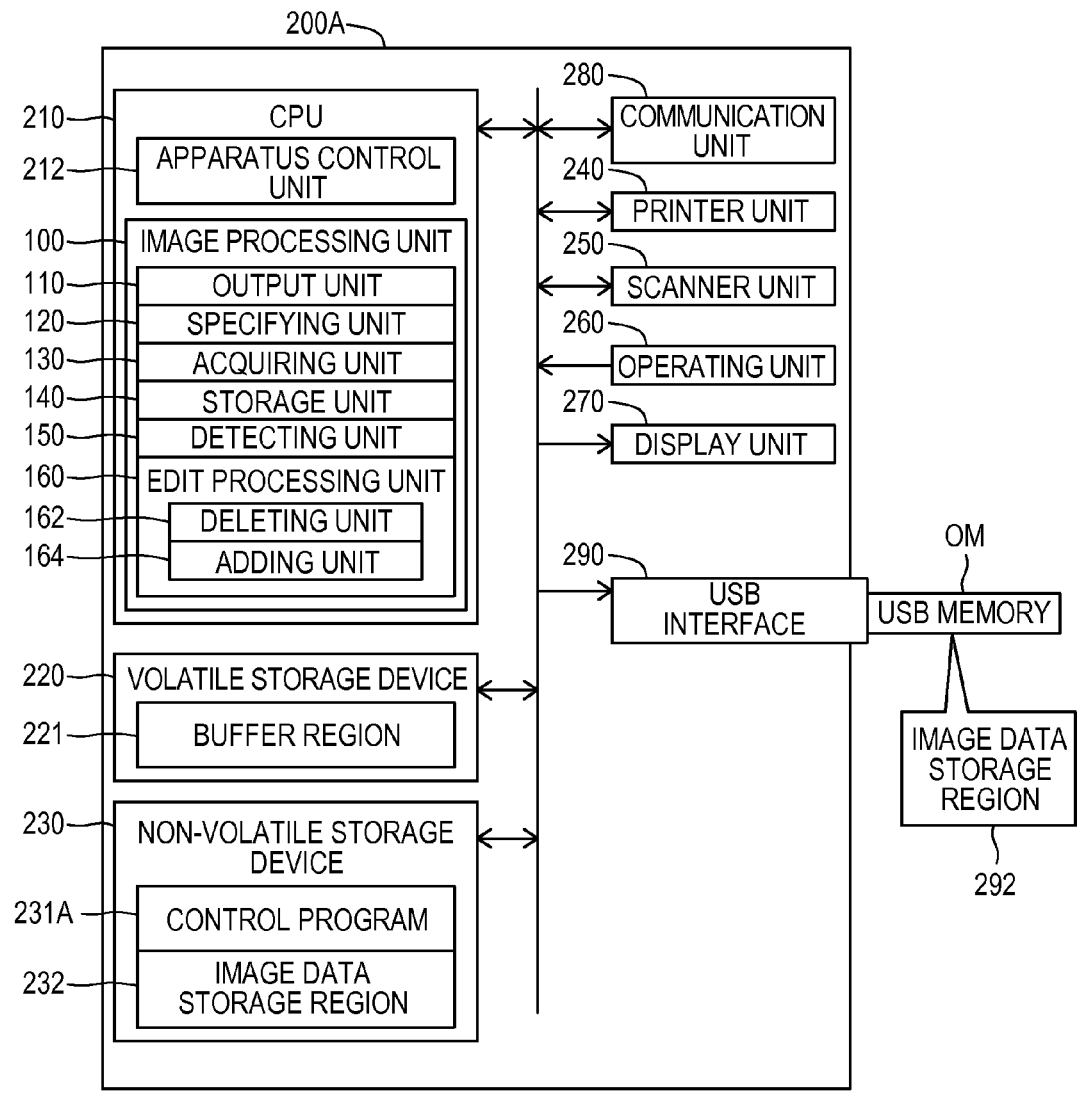
FIG. 11 is a diagram showing a configuration of a multi-function peripheral 200A as an image processing apparatus according to a second illustrative embodiment.

FIG. 11 is a diagram showing the configuration of the multi-function peripheral 200A as the image processing apparatus of the second illustrative embodiment. The multi-function peripheral 200A of the FIG. 11 includes similar constituent elements 210 to 280 to the multi-function peripheral 200 (FIG. 1) of the first illustrative embodiment. The multi-function peripheral 200A further includes a USB interface 290 which can receive a known USB memory OM. The USB memory OM which is loaded in the USB interface 290 is used as an image data storage region 292 which stores target image data.

The non-volatile storage device 230 of the multi-function peripheral 200A stores a control program 231A which is different from the control program 231 of the first illustrative embodiment. The non-volatile storage device 230 of the multi-function peripheral 200A includes an image data storage region 232 which stores target image data. The control program 231A may be provided in the form recorded in a DVD-ROM or the like.

A CPU 210 executes the control program 231A to function as an image processing unit 100 and an apparatus control unit 212. The image processing unit 100 includes functional units 110 to 164 with the same names as the functional units 310 to 364 in the image processing unit 300 (FIG. 1) of the server 400 of the first illustrative embodiment. Since processing which is performed each of these functional units is mostly similar to the processing which is performed by each of the functional units with the same names of the first illustrative embodiment, description will be provided focusing on processing different from the first illustrative embodiment.

B-2: Image Processing of 200A

The multi-function peripheral 200A stores image data generated when the user causes the scanner unit 250 of the multi-function peripheral 200A to read an original in the image data storage region 232 of the non-volatile storage device 230 or the image data storage region 292 of the USB memory OM. The image processing unit 100 of the multi-function peripheral 200A performs image processing for editing target image data selected from one or more image data stored in the image data storage regions 232 and 292 to generate edited target image data.

Figure 12:
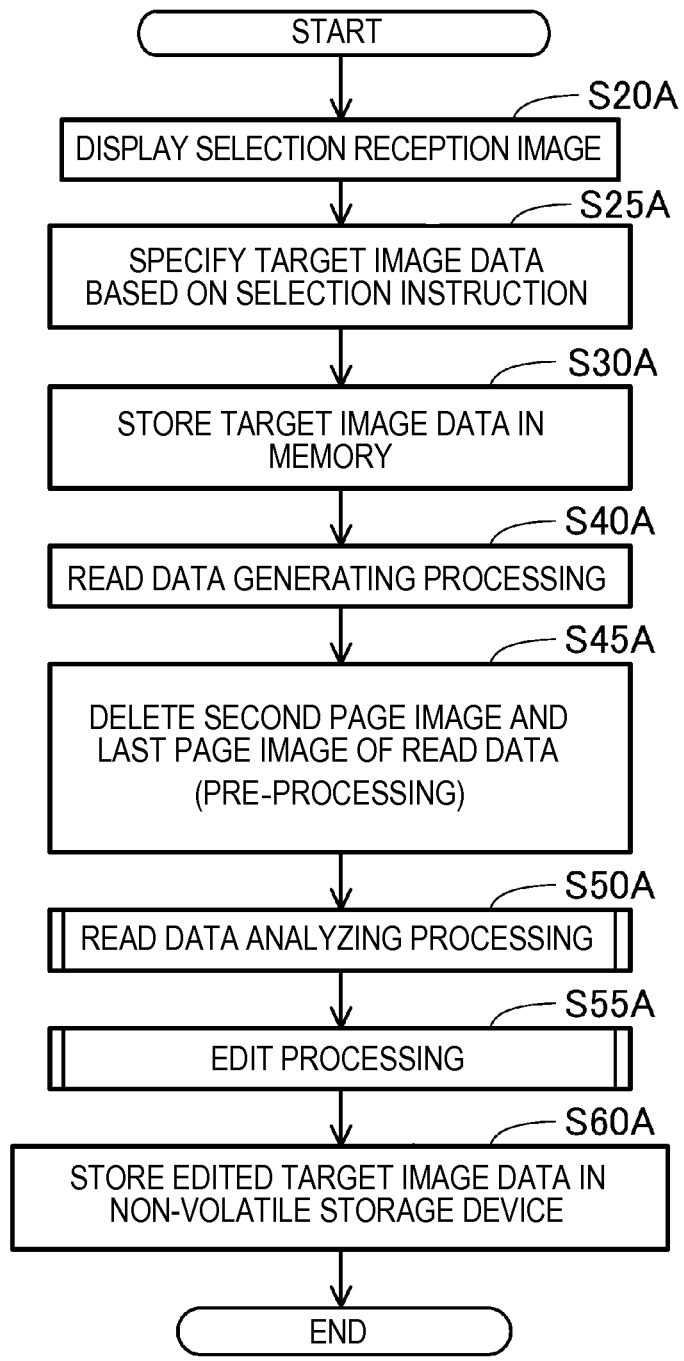
FIG. 12 is a flowchart of image processing in the second illustrative embodiment.

FIG. 12 is a flowchart of image processing of the second illustrative embodiment. The image processing of FIG. 12 is executed by the image processing unit 100 if the multi-function peripheral 200A receives an execution instruction of a specific operation mode, for example, an edit mode from the user.

In Step S20A, the output unit 110 displays the selection reception image MI1 (FIG. 3) on the display unit 270 of the multi-function peripheral 200A and receives a selection instruction from the user. Specifically, the output unit 110 acquires identification information, such as a file name, for identifying a plurality of image data stored in the image data storage region 232 or 292. The output unit 110 generates data representing the selection reception image MI1 using the identification information and displays the selection reception image MI1 on the display unit 270 using the generated data.

In Step S25A, the specifying unit 120 specifies target image data based on the selection instruction. In Step S30A, the storage unit 140 acquires the specified target image data from the image data storage region 232 or 292 and stores the target image data in the buffer region 221 as a memory.

Figure 13A:
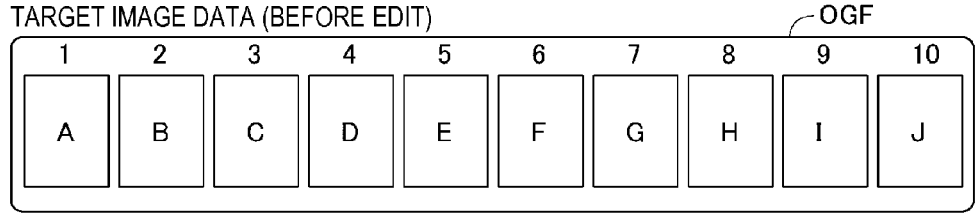
FIGS. 13A to 13E are diagrams showing examples of target image data and read data in the second illustrative embodiment.

FIGS. 13A to 13E are diagrams showing examples of target image data and read data in the second illustrative embodiment. FIG. 13A shows the same target image data OGF as the target image data OGF shown in FIG. 4A. Hereinafter, for example, the target image data OGF shown in FIG. 13A will be described.

Subsequently, in Step S40A, the acquiring unit 130 executes read data generating processing for generating read data for instructing an edit content to be executed on the target image data OGF using the scanner unit 250.

Figure 13B:
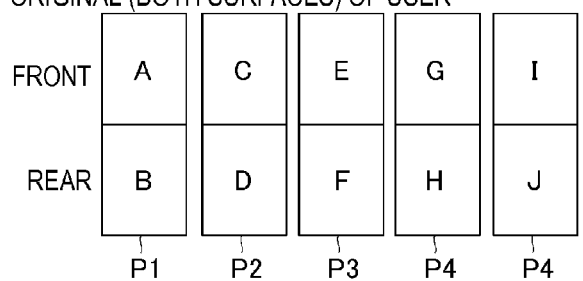

Here, unlike the first illustrative embodiment, in the second illustrative embodiment, it is assumed that the user prepares a plurality of sheets of original with a plurality of page images A to J in the target image data OGF arranged on both surfaces. FIG. 13B shows five sheets P1 to P5 of original which are prepared by the user. On the respective front surfaces of the five sheets P1 to P5 of original, five page images A, C, E, G, and I to which odd-numbered page orders are defined among ten page images A to J of the target image data OGF are arranged. On the respective rear surface of the five sheets P1 to P5 of original, five page images B, D, F, H, and J to which even-numbered page orders are defined among the ten page images A to J of the target image data OGF are arranged.

In the second illustrative embodiment, unlike the first illustrative embodiment, the acquiring unit 130 reads both surfaces of the edit-instruction original prepared by the user using the scanner unit 250 to generate read data. Here, among the both surfaces of the original, a surface which is directed to a specific direction when the original is set in the scanner unit 250 for reading the original is referred to as a first surface, and a surface opposite to the first surface is referred to as a second surface. For example, if the original is set in the scanner unit 250 to be horizontal, a surface which is directed upward is referred to as a first surface, and a surface which is directed downward is referred to as a second surface.

The scanner unit 250 generates read data such that the reading order of the first surface of one sheet of original is before the reading order of the second surface. For example, in FIG. 13B, if an original P1 is set in the scanner unit 250 such that the front surface of the original P1 becomes the first surface and read data is generated, the reading order of a page image A arranged on the front surface of the original P1 is before the reading order of a page image B arranged on the rear surface of the original P1. To the contrary, the original P1 is set in the scanner unit 250 such that the rear surface of the original P1 becomes the first surface and read data is generated, the reading order of the page image B arranged on the rear surface of the original P1 is before the reading order of the page image A arranged on the front surface of the original P1.

Figure 13C:
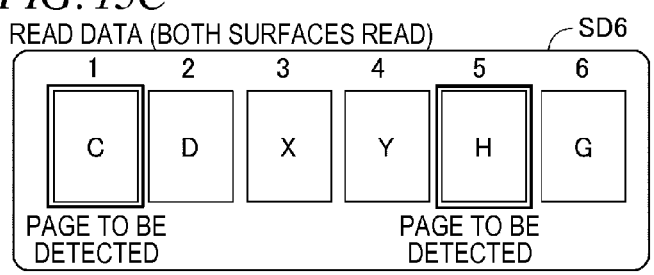
Figure 13D:
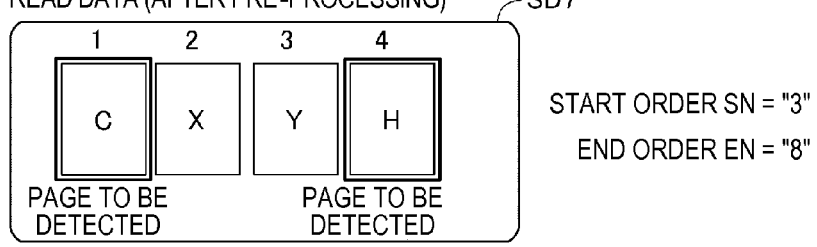
Figure 13E:
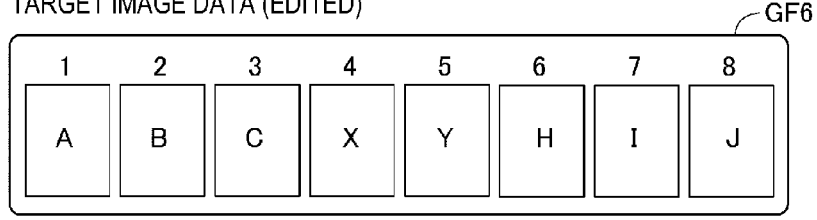

For example, read data SD6 shown in FIG. 13C is generated when three sheets of original are read by the scanner unit 250. The three sheets of original include, in a reading order, an original P2 with two page images C and D arranged, an original with two page images X and Y arranged as page images to be added, and an original P4 with two page images H and G arranged. Of the three sheets, the original P2 is set in the scanner unit 250 such that the front surface on which the page image C is arranged becomes the first surface. The original with the two page images X and Y arranged is set in the scanner unit 250 such that the surface on which the page image X is arranged becomes the first surface. The original P4 is set in the scanner unit 250 such that the rear surface on which the page image H is arranged becomes the first surface. As a result, the read data SD6 shown in FIG. 13C is generated.

Subsequently, in Step S45A, the detecting unit 150 deletes a page image with the second reading order and a page image with the last reading order in read data from the read data as pre-processing of read data analyzing processing. That is, a page image arranged on the second surface of an original initially read and a page image arranged on the second surface of an original last read are deleted from read data. In the example of FIGS. 13A to 13E, the page image D and the page image G are deleted from the read data SD6 (FIG. 13C), and read data SD7 (FIG. 13D) subjected to the pre-processing is generated.

Subsequently, in Step S50, the image processing unit 100 executes the same read data analyzing processing as the read data analyzing processing (FIG. 5) of the first illustrative embodiment using the read data SD7 subjected to the pre-processing. In the read data analyzing processing, as described in the first illustrative embodiment, the initial page image and the last page image of the read data SD7 are detected. Accordingly, when the read data SD6 before the pre-processing is executed is generated, a page image arranged on the first surface of an original initially read and a page image arranged on the first surface of an original last read are detected. In the example of FIG. 6, the page image C and the page image H of the read data SD6 are detected.

Subsequently, in Step S55A, the edit processing unit 160 of the image processing unit 100 executes the same edit processing as the edit processing (FIG. 6) of the first illustrative embodiment. As a result, edited target image data GF6 in which the four page images D, E, F, and G of the target image data OGF are replaced with the two page images X and Y is generated.

If the edited target image data GF6 is generated, in Step S60A, the image processing unit 100 stores the edited target image data in the image data storage region 232 or the image data storage region 292, in which the target image data before edit is stored, and ends the image processing.

According to the above-described second illustrative embodiment, the multi-function peripheral 200 can generate the read data using the scanner unit 250 as a reading execution unit and can edit the target image data OGF using the generated read data. As a result, the multi-function peripheral 200 can edit the target image data OGF alone.

According to the second illustrative embodiment, although the read data SD6 is generated by reading the first surface of an original and the second surface opposite to the first surface, respectively, if two page images of the target image data OGF are included in data generated by reading the first surface of the original in the read data, a page image to be deleted which is specified based on the two page images is deleted from the target image data OGF. Accordingly, even the user has a double-sided original at hand, it is possible to delete a desired page image from the target image data OGF using the double-sided original. Specifically, the user causes the scanner unit 250 to read the original such that a page image to be detected, that is, a page image for specifying a page image to be deleted is located on the first surface of the original, thereby deleting a desired page image from the target image data OGF.

While the present invention has been shown and described with reference to certain illustrative embodiments thereof, it will be understood by those skilled in the art that various changes in form and details may be made therein without departing from the spirit and scope of the invention as defined by the appended claims.

B. Modified Illustrative Embodiment (1) In the above-described first illustrative embodiment, the image data of the user is stored in the image data storage region 432 of the server 400. Alternatively, the image data may be stored in a storage server 500 (FIG. 1) provided separately from the server 400. In this case, in Step S50 of FIG. 2, the storage unit 340 transmits identification information for identifying target image data specified in Step S45 to the storage server 500, and requests for transmission of target image data. The storage unit 340 receives target image data from the storage server 500 through the communication unit 480 and stores the target image data in the buffer region 221. The image processing unit 300 transmits, that is, uploads the edited target image data to the storage server 500 through the communication unit 480. The storage server 500 replaces the target image data before edit with the edited target image data. In this case, the user can easily edit the image data stored in the separate storage server 500 using the original. In this modified illustrative embodiment, the communication unit 480 is an example of a second receiving unit and a transmitting unit.

(2) In the read data analyzing processing (FIG. 5) of the above-described first illustrative embodiment, an image of a white sheet is used as the initial page image of read data so as to set the start order SN to "0". Alternatively, a different specific page image may be used. For example, a page image to which the last page order is defined in the target image data OGF may be used. Similarly, in the read data analyzing processing (FIG. 5) of the above-described first illustrative embodiment, an image of a white sheet is used as the last page image of read data so as to set the end order EN to "the last page order +1". Alternatively, a different specific page image may be used. For example, a page image to which the initial page order is defined in the target image data OGF may be used.

(3) In the read data analyzing processing of the first illustrative embodiment, a page image with an initial reading order and a page image with a last page order in read data are page images to be detected for detecting a specific page image of the target image data OGF. Further, a reading order between the initial page image and the last page image in the read data is defined to a page image to be added. Alternatively, a page image to be detected may be a page image with an initial reading order and a page image with a second reading order. A reading order after a third reading order may be defined to a page image to be added.

(4) In the read data analyzing processing of the first illustrative embodiment, the detecting unit 350 compares the page number PN (FIGS. 4A to 4C) included in the footer region of a page image to determine whether a page image of the read data coincides with a specific page image of the target image data OGF (FIG. 5: Steps S115 and S155). Alternatively, the detecting unit 350 may execute such determination using other kinds of feature information. For example, the detecting unit 350 may compare an image name arranged in the footer region or the header region of a page image or an identification code of an image to execute the determination. Alternatively, A QR Code (Registered Trademark), a barcode, or the like representing the feature information may be arranged in a page image, and the detecting unit 350 may compare information obtained by reading the QR Code (Registered Trademark) or the barcode to execute the determination. The detecting unit 350 may calculate the feature amount (for example, histogram data or data representing an arrangement pattern of an edge) of contents (photograph, character, drawing, or the like) of a page image and may compare the feature amount to execute the determination.

(5) In the read data of the first illustrative embodiment, although the number of pixels per page of the first partial read data and the second partial read data is smaller than the number of pixels per page of the third partial read data, the number of pixels per page may be the same between those three partial read data.

(6) In the above-described first illustrative embodiment, although various edit manner, such as deletion using two sheets of original (FIGS. 4A to 4C), deletion using one sheet of original (FIGS. 7A to 7C), addition (FIGS. 8A to 8C), and replacement (FIGS. 9A to 9C), are possible, only a part of these edit manner may be employed.

(7) In the above-described illustrative embodiments, the image processing which is executed by the image processing unit 300 of the server 400 may be executed by an apparatus different from the server 400, for example, a personal computer connected to the multi-function peripheral 200. In this case, for example, the image processing may be executed by a scanner driver which is installed in a personal computer so as to control the scanner unit 250 of the multi-function peripheral 200 or a stand-alone scanner (not shown). The server 400 is not limited to an apparatus having a single housing, and may be configured by a computing system (for example, a distributed computing system which realizes so-called cloud computing) including a plurality of computers.

(8) In the above-described illustrative embodiments, a part of the configuration realized by hardware may be replaced with software, and conversely, a part of the configuration realized by software may be replaced with hardware.

What is claimed is:

1. An image processing apparatus comprising:
 a control device configured to:
  store, in a memory of the image processing apparatus, image data representing a plurality of page images to which page orders are defined, respectively, wherein the plurality of page images include a first page image to which a first page order is defined, a second page image to which a second page order is defined, and a third page image to which a third page order is defined, and wherein the second page order is a page order between the first page order and the third page order;

acquire read data generated by reading an original; and if the read data includes the first page image and the third page image, delete the second page image from the image data to generate edited image data.

2. The image processing apparatus according to claim 1, wherein the plurality of page images of the image data include K second page images to which K second page orders are defined, respectively, and the K second page orders are page orders between the first page order and the third page order, where K is an integer equal to or greater than two, and wherein the control device is configured to, if the read data includes the first page image and the third page image, delete the K second page images from the image data to generate the edited image data.

3. The image processing apparatus according to claim 1, wherein the control device is further configured to, if the read data includes the first page image, the third page image, and a fourth page image which is not included in the image data, add the fourth page image into the image data to generate the edited image data.

4. The image processing apparatus according to claim 3, wherein reading orders of the original are defined to a plurality of page images of the read data, wherein the control device is configured to, if a reading order of the fourth page image in the read data is between a reading order of the first page image in the read data and a reading order of the third page image in the read data, add the fourth page image into the image data to generate the edited image data, wherein a fourth page order is defined to the fourth page image in the edited image data, and wherein the fourth page order in the edited image data is a page order same as the second page order which has been defined to the second page image deleted from the image data.

5. The image processing apparatus according to claim 4, wherein the control device is configured to, if the read data includes L fourth page images, add the L fourth page images into the image data to generate the edited image data, where L is an integer equal to or greater than two, wherein L consecutive fourth page orders are defined to the L fourth page images in the edited image data, respectively, and wherein at least one of the L fourth page orders in the edited image data is same as the second page order which has been defined to the second page image deleted from the image data.

6. The image processing apparatus according to claim 4, wherein the plurality of page images of the image data include N second page images to which N second page orders are defined, respectively, and the N second page orders are page orders between the first page order and the third page order, where N is an integer equal to or greater than one, wherein the control device is configured to, if the read data includes M fourth page images, add the M fourth page images into the image data to generate the edited image data, where M is an integer equal to or greater than one and different from N, wherein M consecutive fourth page orders are defined to the M fourth page images in the edited image data, respectively, and wherein at least one of the M fourth page orders in the edited image data is same as at least one of the N second page orders which have been defined to the N second page images deleted from the image data.

7. The image processing apparatus according to claim 1, wherein the plurality of page images of the image data further include a fifth page image to which a fifth page order subsequent to the first page order of the first page image is defined, wherein the control device is further configured to, if the read data includes the first page image, the fifth page image, and a sixth page image which is not included in the image data, add the sixth page image into the image data to generate the edited image data, wherein a sixth page order is defined to the sixth page image in the edited image data, wherein the sixth page order in the edited image data includes a same page order as the fifth page order which has been defined to the fifth page image in the image data, and wherein a page order subsequent to the sixth page order in the edited image data is defined to the fifth page image in the edited image data.

8. The image processing apparatus according to claim 1, wherein the control device is further configured to:

output identification information for identifying a plurality of image data; and specify image data to be processed from among the plurality of image data identified by the identification information according to a user selection, and wherein the control device is configured to delete the second page image from the specified image data to generate the edited image data.

9. The image processing apparatus according to claim 1, wherein the read data is generated by reading a first surface of the original and a second surface of the original opposite to the first surface, and wherein the control device is configured to, if data generated by reading the first surface of the original in the read data includes the first page image and the third page image, delete the second page image from the image data to generate the edited image data.

10. The image processing apparatus according to claim 1, wherein the control device is further configured to:

detect whether first partial read data generated by reading a first original in an initial reading order includes the first page image;

detect whether second partial read data generated by reading a second original in a last reading order includes the third page image; and if it is detected that the first partial read data includes the first page image and the second partial read data includes the third page image, delete the second page image from the image data to generate the edited image data.

11. The image processing apparatus according to claim 10, wherein the read data includes the first partial read data, the second partial read data, and third partial read data generated by reading a different original in an order between the initial reading order and the last reading order, and wherein the number of pixels per page of each of the first partial read data and the second partial read data is smaller than the number of pixels per page of the third partial read data.

12. The image processing apparatus according to claim 1, wherein the control device is further configured to, if the read data includes the first page image and does not include the third page image, delete the first page image from the image data to generate the edited image data.

13. The image processing apparatus according to claim 1, wherein the control device is configured to, if the read data includes a predetermined page image and the third page image, delete specific page images from the image data to generate the edited image data, and
wherein the specific page images to be deleted are either (a) page images to which an initial page order, an immediately preceding page order of the third page order, and a page order between the initial page order and the immediately preceding page order are defined in the image data or (b) page images to which an immediately subsequent page order of the third page order, a last page order, and a page order between the immediately subsequent page order and the last page order are defined in the image data.

14. The image processing apparatus according to claim 1, further comprising:
a reading execution unit configured to read the original to generate the read data,
wherein the control device is configured to acquire the read data generated by the reading execution unit.

15. The image processing apparatus according to claim 1, further comprising:
a first receiving unit configured to receive the read data generated by reading the original from an external apparatus,
wherein the control device is configured to acquire the received read data.

16. The image processing apparatus according to claim 1, further comprising:
a second receiving unit configured to receive the image data to be stored in the memory of the image processing apparatus, from a server apparatus provided separately from the image processing apparatus; and
a transmitting unit configured to transmit the edited image data to the server apparatus.

17. A non-transitory computer-readable storage medium having a computer program stored thereon and readable by a computer of an image processing apparatus, the computer program, when executed by the computer, causing the computer to perform operations comprising:
storing, in a memory of the image processing apparatus, image data representing a plurality of page images to which page orders are defined, respectively, wherein the plurality of page images include a first page image to which a first page order is defined, a second page image to which a second page order is defined, and a third page image to which a third page order is defined, and wherein the second page order is a page order between the first page order and the third page order;
acquiring read data generated by reading an original; and
if the read data includes the first page image and the third page image, deleting the second page image from the image data to generate edited image data.

* * * * *